Figure 1:
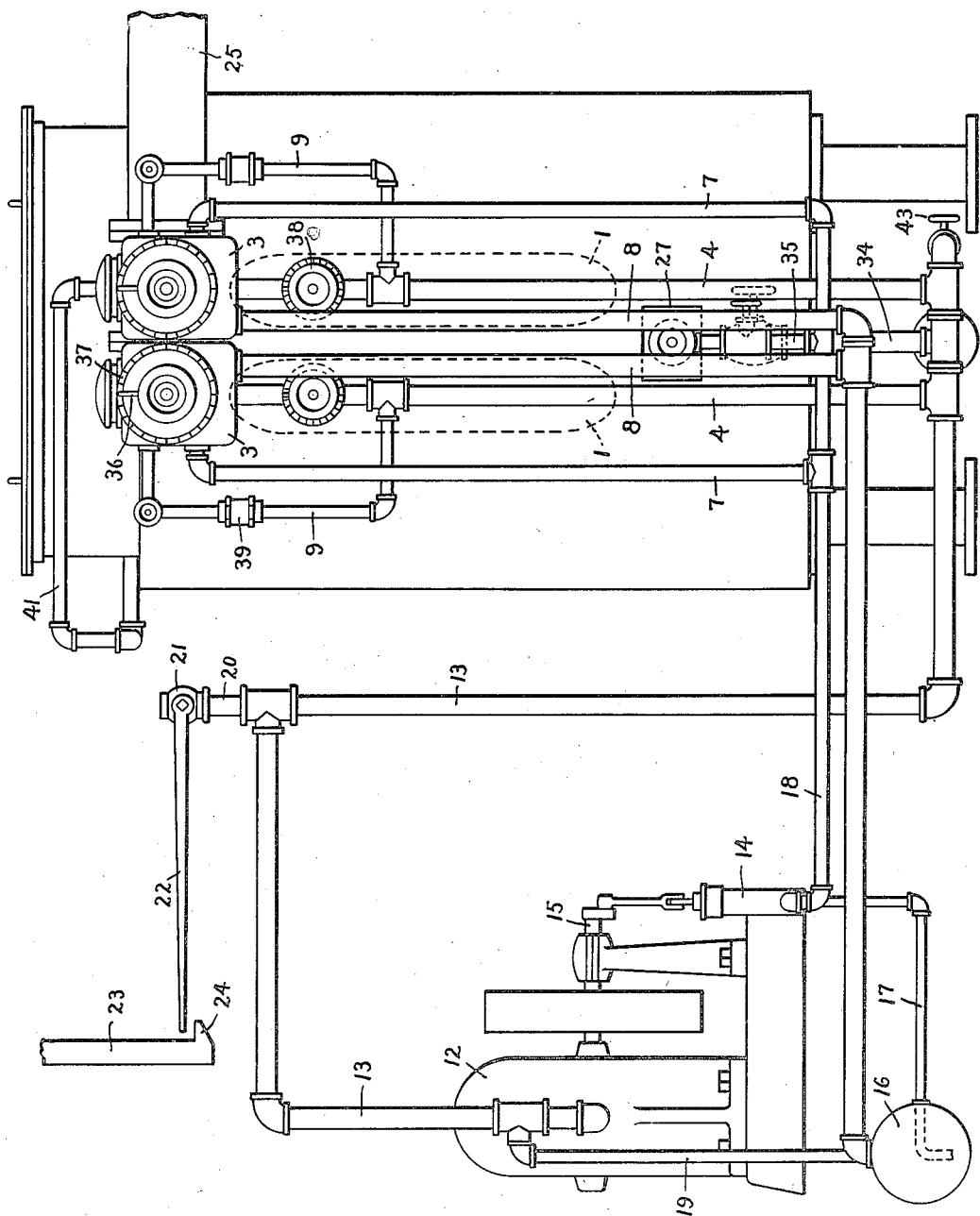

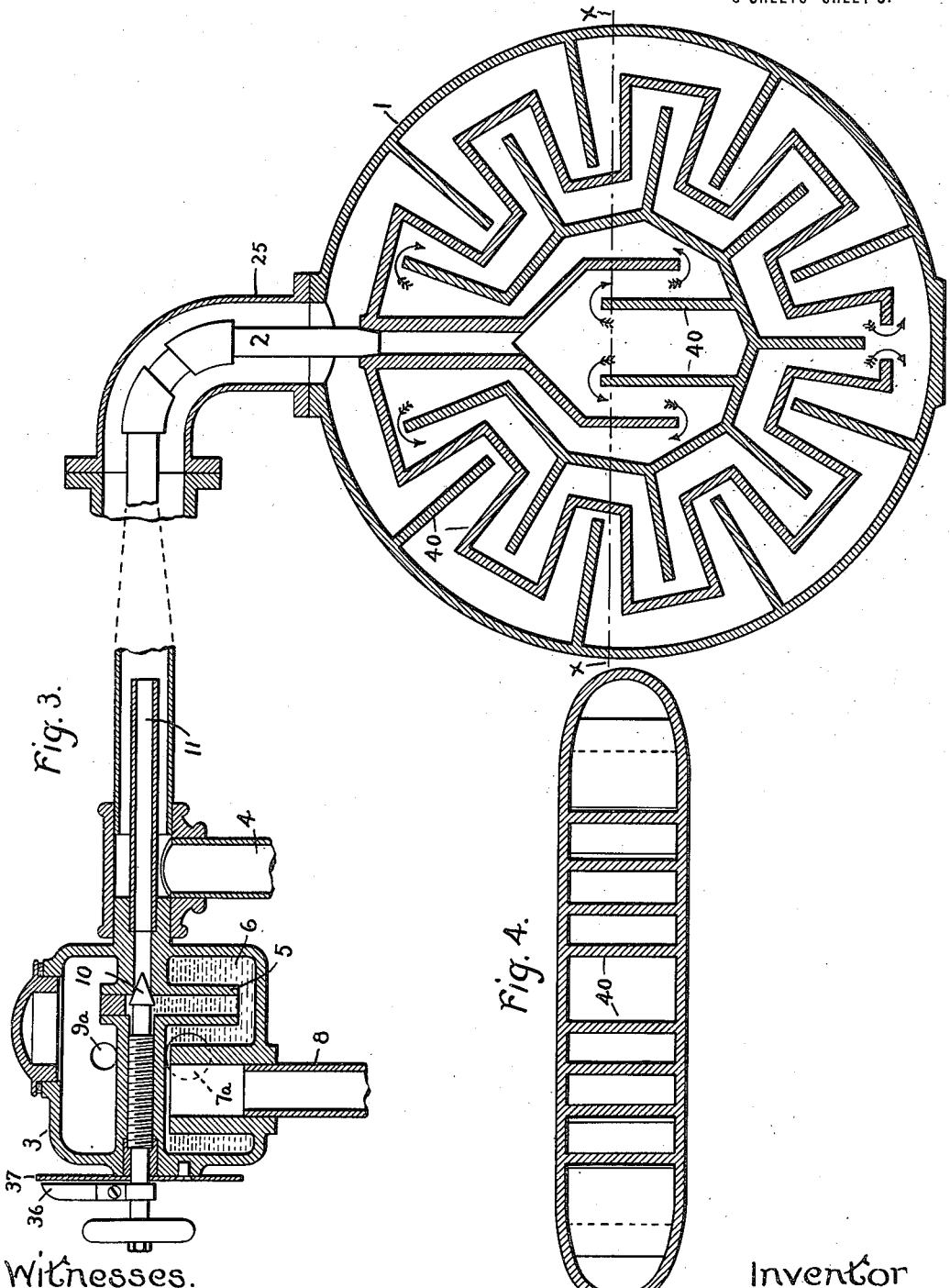

UNITED STATES PATENT OFFICE.

WALTER CLINT DAYTON, OF BUFFALO, NEW YORK, ASSIGNOR TO GEORGE H. SMITH, TRUSTEE, OF BUFFALO, NEW YORK.

PROCESS OF MAKING GAS.

1,174,971.  Specification of Letters Patent.  Patented Mar. 14, 1916.

Continuation of application Serial No. 816,761, filed February 5, 1914. This application filed January 25, 1915. Serial No. 4,187.

*To all whom it may concern:*

Be it known that I, WALTER CLINT DAYTON, a citizen of the United States, residing at Buffalo, in the county of Erie, State of New York, have invented certain new and useful Improvements in Process of Making Gas, of which the following is a specification.

The present application is a continuation of a former application, Serial No. 816,761, filed February 5, 1914.

My present invention relates to a method of making a combustible gas and its principal objects are to produce a uniform product of maximum calorific value and to secure controllability of the volume or rate of production without substantial variation of the calorific value and chemical composition of the gas.

In Patent No. 1,013,050 to Orr is described a method of making combustible gas by the chemical interaction of a hydrocarbon and air whereby a mixture of the hydrocarbon and air is charged into a suitable converter where partial oxidation occurs and the hydrocarbon is decomposed, yielding a combustible gas. No provision is made to maintain the proportion of hydrocarbon relative to the air constant.

I have discovered that a comparatively slight variation of proportion in the mixture results in a change of decomposing temperature in the converter and is sufficient to completely change the composition of the resulting gas. Although the carbon dioxid content may be changed but a few per cent. in a given case, the relative percentages of carbon monoxid, hydrogen, and of methane and other light hydrocarbon gases are materially changed. For example, an increase in air content, increases the converter temperature and markedly decreases the percentage of hydrocarbons in the resulting gas.

In accordance with my invention a uniform mixture of liquid hydrocarbon and a combustion-supporting gas, such as air, in constantly maintained proportions suitable for securing the desired chemical combination is subjected to an elevated temperature in a retort whereby the temperature of oxidation within the retort remains substantially constant, even when the rate of delivery of the mixture is varied and hence the composition of the resulting gas is substantially uniform.

Another aspect of my invention includes a method for varying the rate of delivery of a mixture of a combustible and air while maintaining a predetermined ratio of said materials substantially constant, by varying the pressure of the incoming air and varying the feed of the combustible automatically in step with and in response to the variation of air pressure while maintaining constant the valve openings and other mechanical adjustments. This feature of my invention is applicable to the production of an oil and air mixture suitable for complete combustion as well as for furnishing a mixture suitable for making a combustible gas.

As will be pointed out with greater particularity in the claims and explained hereinafter, the combustible is delivered at the inlet of the mixing device in such a way as to substantially eliminate fluctuations which would be caused by the friction, inertia and variable hydrostatic head of a liquid column, and is introduced at a pressure derived in such manner from the air pressure as to feed the proper amount of the combustible for different air pressures as to maintain the desired ratio.

The accompanying drawings illustrate one form of apparatus suitable for carrying out the process constituting my invention.

Figure 2:
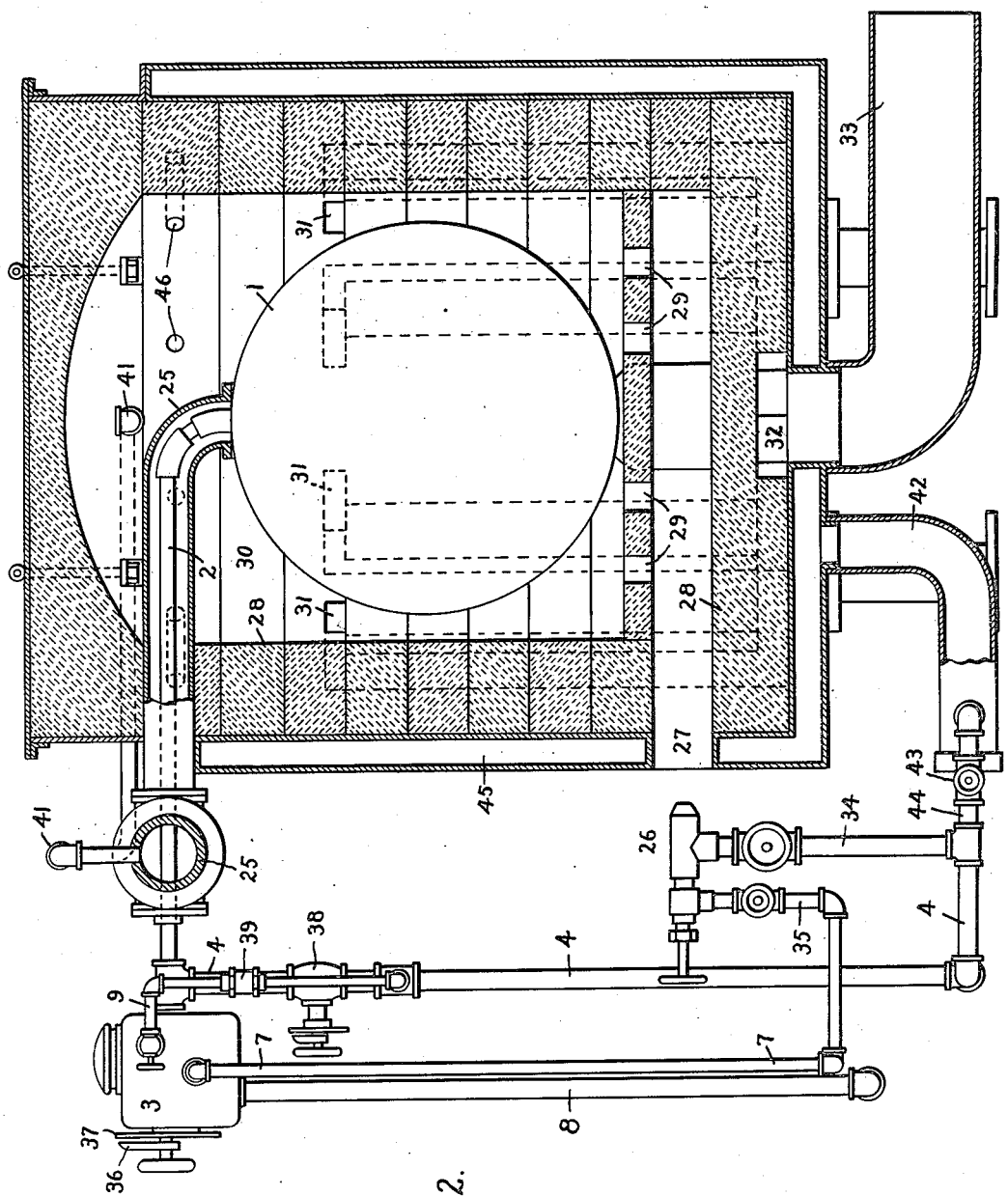

Figure 1 is a front elevation of the apparatus; Fig. 2 is a vertical view taken at right angles to Fig. 1, partly in section and partly in elevation; Fig. 3 is a longitudinal section of a mixing device and a converter for carrying out the process; and Fig. 4 is a section of the converter taken on the line $x$—$x$ of Fig. 3.

Referring to Fig. 2 the mixture of hydrocarbon or other combustible and air is introduced into a converter or retort 1, through a conduit 2, by a feed device 3, shown in greater detail in Fig. 3. Before describing the details of construction of the converter and the relation of the various other parts of the apparatus, I shall describe the structure of the feed device shown in Fig. 3. By this device a mixture of air and the liquid hydrocarbon is introduced into the conduit 2, the air entering by means of a pipe 4 and the hydrocarbon oil by means of a tube 5 which dips into a reservoir 6. The oil is introduced into the reservoir by means of a conduit 7, Fig. 2, the openings 7ª for which is indicated partly in solid and partly in broken lines in Fig. 3. More than sufficient oil to supply the required feed is introduced at all times and the excess is drawn off through an overflow pipe 8 so that there is maintained at all times a substantially constant level in the reservoir 6. Above the oil is maintained an air pressure substantially equal to the pressure of the air at its source by means of a branch pipe 9 leading from the pipe 4, as shown in Fig. 2, the opening into the space above the oil being indicated at 9ª, Fig. 3. The needle valve 10 may be used to adjust initially the opening of the oil inlet from the reservoir to the tube 11 which introduces the oil into the conduit 2. As the pressure necessary to overcome the negative hydrostatic pressure of the column of oil from the constant level of oil to the opening of the needle valve 10 is negligibly low, the fluctuations and variations of oil delivery due to friction and inertia of a liquid column are reduced to a negligible minimum. The effective pressure upon the oil feeding it into the conduit 2 is equal to the difference between the pressure of the partly expanded air in the conduit 2 and the initial air pressure upon the surface of the oil in the reservoir 6, hence with the described construction the oil is introduced at all times at a pressure bearing such a relation to the pressure of air that the ratio between the oil and air are maintained substantially constant for different air pressures. The needle valve and accompanying air and oil conduits are herein and in the appended claims referred to as a mixing device to distinguish these parts from the oil reservoir, which though it forms mechanically with the mixing device a unitary structure has a separate function, namely, to supply oil to the mixing device proper.

The air is supplied, as shown in Fig. 1, by an air compressor 12 to a main 13 from which it is fed into the conduit 4. Two feed devices are illustrated in Fig. 1 each supplying a retort but of course as the two units are identical reference in the description will be made to but one.

The oil is conveyed into the feed device by means of an oil pump 14 which is most conveniently connected to the shaft 15 and operated by the same motor operating the air compressor, the oil being taken from a main supply tank 16 through the pipe 17 and forced into a pipe 18 communicating with the pipe 7 leading to the feed device 3. A branch pipe 19 leads from the air main 13 to the supply tank 16, introduces an air pressure upon the oil in the supply tank equal to the pressure on the oil in the reservoir 6. A branch pipe 20 leads to a valve 21 provided with a lever arm 22. A rod 23 carrying a finger 24 positioned to engage with the lever arm 22 is attached to a gas holder (not shown). When the gas holder is filled to a predetermined height, the finger 24 engages with the arm 22, thus opening the valve 21 and releasing the air pressure in the main 13. This has the effect of reducing the pressure of air in the air main and therefore both the pressures feeding air and oil. In this manner the rate at which gas is produced is automatically controlled in accordance with the demand. Of course this particular device for adjusting the air pressure in accordance with the demand for gas is merely illustrative, and other regulating and controlling devices may be used in its place.

Referring again to Fig. 3, the mixture of air and oil is introduced into the retort 1, shown in section, and passes back and forth through the baffled interior of the retort, which is maintained at a temperature of combustion and is finally discharged through a conduit 25 surrounding the conduit 2 which introduces the mixture of air and combustible. The connection of the conduit 25 to the gas holder has not been shown in the drawing.

At starting the retort is heated in the following manner: A mixture of combustible and air is blown by means of a torch 26 into passage 27, Fig. 2, passing through the housing 28 of the retort, and the burning gases pass up through the passages 29 through the housing which may consist of firebrick or other refractory material, and are introduced into a chamber 30 around the retort which is thus heated to a high temperature. More than one retort may be used, two being indicated by dotted lines in Fig. 1. The by-products of this combustion pass out through flues 31 into the base flue 32 and out through an exit pipe 33 into the atmosphere. The torch 26 may be supplied with air and combustible in any suitable manner, most conveniently by feeding it with air by means of a branch pipe 34 from the air pipe 4 and with oil by means of a branch pipe 35 from the oil pipe 7.

During the preliminary heating the needle valve carrying a pointer 36, moving over a fixed graduated dial 37 may be closed. The valve 38 in the air pipe 4 may also be closed. With the retort 1 at a temperature of about 1400° F. the air pressure at a desired value, and the oil reservoir 6 filled to the desired level, the valve 38 is opened, thereby introducing air into the mixing device pipe 2. The needle valve 10, Fig. 3, is then gradually opened, to supply oil, the check valve 39 preventing any possible back flow of air or hydrocarbon from the feed device. The mixture of hydrocarbon and air enters the heated retort, passes back and forth through the passages between the baffles 40 as indicated by arrows, and undergoes chemical reaction accompanied by partial combustion with the production of a fixed combustible gas. The quantity of oil fed is gradually increased until a gas of desired calorific value and chemical composition is made, after which no further hand regulation of combustible and air is necessary or desirable. The heated gases are discharged from the retort through the conduit 25 passing around the conduit 2 conveying the entering mixture of air and oil and thus heating the mechanically atomized hydrocarbon oil to form a hydrocarbon vapor which is intimately mixed with the air.

In most cases the maintenance of the desired temperature will require some external heating in addition to the heat developed within the retort by the partial combustion of the hydrocarbon. However, when it is permissible to make a gas relatively low in calorific value the percentage of air may be made great enough to maintain the desired temperature in the retort without external heating.

The external heating of the retort should preferably be so adjusted that a temperature of about 1400 to 1600° F. is maintained, the specific temperature depending on the composition of gas desired. This is accomplished by taking gas as made, from the gas conduit 25 into the chamber 30 through a pipe 41. Air is admitted through the conduit 42 by opening a valve 43 in a branch pipe 44 of the air system and the air is conducted up through the casing 45 surrounding the housing 28 of the retort, and is introduced into the chamber 30 surrounding the retort through holes 46 in the housing and casing. The combustion of the gas in the chamber 30, the quantity of which may be thermostatically controlled, assists in maintaining the retorts heated to a temperature necessary to produce the desired gasification of the hydrocarbon and the products of this combustion pass out to the atmosphere through flues 31 into the base flue 32 and out through exit pipe 33.

The following example is given as illustrative of the product made when proceeding in accordance with my invention. Operating preferably at a temperature of about 1480° F. with a 38° Baumé fuel oil containing about 80.3% carbon and 19.7% hydrogen, I have obtained a gas having after purification a calorific value of about 490 B. t. u. per cubic foot and the following approximate chemical composition:

| | Parts by volume. |
|---|---|
| Hydrogen | 7.3 |
| Methane | 12.1 |
| Carbon monoxid | 7.0 |
| Hydrocarbon gases other than methane, chiefly ethylene | 13.3 |
| Carbon dioxid | 5.3 |
| Nitrogen | 54.7 |
| Oxygen | 0.3 |

The converter temperature as read from thermo-couples maintains itself substantially constant with varying air feed pressures and consequently varying rates of gas production as the increased or decreased development of heat units by the partial combustion within the retort is substantially compensated by the greater rate of flow of the gases which carry away heat from the retort into the conduit 24. Were the ratio of oil and air disturbed, the temperature within the retort will not remain constant and the gas made will vary widely in composition. For example, should the quantity of oil be decreased the gas made not only will contain less combustible matter, but the temperature of the retort will rise, the proportion of hydrocarbon gases will materially decrease and the proportion of hydrogen and carbon monoxid will increase.

While I have described one form of apparatus suitable for carrying out my invention, I wish it to be understood that this apparatus is illustrative only and I mean by the appended claims to cover the method of making gas from any combustible liquid and any combustion-supporting gas in the described or equivalent apparatus.

What I claim as new and desire to secure by Letters Patent of the United States, is:—

1. The process of making gas of substantially constant composition and calorific value from a liquid combustible which consists in introducing a combustion-supporting gas under pressure into a mixing device, independently delivering a combustible at a substantially constant level so close to the inlet of said mixing device as to substantially eliminate the effects of friction and inertia of the liquid upon its delivery into the mixing device, introducing said combustible into the mixing device in a predetermined ratio to the quantity of combustion-supporting gas, at a pressure varying with the pressure of the combustion-supporting gas to maintain said ratio constant, varying the pressure of the combustion-supporting gas when the amount of gas to be made is to be varied, conducting the resulting mixture to a heated zone to produce chemical reaction, and recovering for use the products of said reactions.

2. The process of making gas of substantially uniform composition and calorific value which consists in introducing air under pressure to a mixing device, independently delivering a combustible so close to the inlet of said mixing device that fluctuations of pressure due to friction and inertia are substantially absent, introducing said combustible into the mixing device in such ratio to the quantity of air that the quantity of air is insufficient to completely burn the combustible and at a pressure automatically varying with the air pressure to maintain said ratio substantially constant, conducting the resulting mixture to a heated zone, permitting chemical reaction, and conducting away the products of said reaction.

3. The process of making gas of substantially uniform calorific value from a liquid combustible which consists in introducing air under pressure to a mixing device, delivering a combustible against a substantially constant and negligibly low hydrostatic head close to the inlet of said device to eliminate fluctuations of the discharge, introducing said combustible into the mixing device at a pressure derived from and varying with the air pressure to produce at different air pressures a mixture of combustible and air in which the air is insufficient in amount to completely burn the combustible, varying the air pressure when the amount of gas is to be varied, correspondingly varying the pressure on the combustible in response to said variation in air pressure to maintain the predetermined ratio substantially constant, conducting the resulting mixture in a heated zone to produce incomplete combustion and conducting away the products of said combustion.

4. The process which consists in delivering air under pressure to a mixing device having air and oil inlets, independently supplying oil at a substantially constant level so close to the oil inlet as to substantially eliminate the effects of inertia and friction, feeding the oil into said mixing device at a pressure equal to the difference between the initial air pressure and the air pressure after partial expansion in the mixing device, varying the air pressure to secure desired variations in the rate of delivery of the resulting mixture, and varying the pressure on the oil by and in accordance with the variation of air pressure to maintain a predetermined proportion substantially constant, introducing said mixture to a heated reaction zone and withdrawing the resulting gas.

5. The process of making gas of substantially uniform calorific value which consists in introducing air under pressure to a mixing device, maintaining a supply of combustible at a substantially constant level and at a negligibly low head so close to said mixing device that variations of influx of combustible due to friction, inertia and hydrostatic head are substantially absent, introducing said combustible into the mixing device with an air injector in desired proportion to the air, varying the initial pressure of the air when and while varying the rates of delivery of said materials thereby correspondingly varying the feed of said combustible automatically in response to said variation in air pressure to maintain said proportions substantially constant, introducing the mixture to a zone maintained at a temperature of oxidation and recovering the products of a chemical reaction occurring in said zone.

In witness whereof, I have hereunto set my hand this 20th day of January, 1915.

WALTER CLINT DAYTON.

Witnesses:
Jos. A. KIRSCH,
G. V. O'NEILL.